United States Patent

Mugglestone

(10) Patent No.: US 9,650,899 B2
(45) Date of Patent: May 16, 2017

(54) IMPINGEMENT COOLING OF TURBINE BLADES OR VANES

(75) Inventor: Jonathan Mugglestone, Nottingham (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 699 days.

(21) Appl. No.: 14/126,440

(22) PCT Filed: Jun. 11, 2012

(86) PCT No.: PCT/EP2012/060985
§ 371 (c)(1),
(2), (4) Date: Dec. 15, 2013

(87) PCT Pub. No.: WO2013/000691
PCT Pub. Date: Jan. 3, 2013

(65) Prior Publication Data
US 2014/0119888 A1 May 1, 2014

(30) Foreign Application Priority Data
Jun. 27, 2011 (EP) .................... 11171552

(51) Int. Cl.
*F01D 5/18* (2006.01)
*B23P 15/04* (2006.01)

(52) U.S. Cl.
CPC ............... *F01D 5/18* (2013.01); *B23P 15/04* (2013.01); *F01D 5/189* (2013.01);
(Continued)

(58) Field of Classification Search
CPC ........ F01D 5/18; F01D 5/186; F05D 2230/51; F05D 2230/53; F05D 2230/61; F05D 2250/70; B23P 15/04; Y10T 29/49337
See application file for complete search history.

(56) References Cited

U.S. PATENT DOCUMENTS 3,540,810 A 11/1970 Kercher
3,628,880 A 12/1971 Hope
(Continued)

FOREIGN PATENT DOCUMENTS

CN 201474728 U 5/2010
EP 0091799 10/1983
(Continued)

OTHER PUBLICATIONS

RU Decision of Grant dated Jul. 26, 2016, for RU application No. 2013158323.

*Primary Examiner* — Igor Kershteyn
(74) *Attorney, Agent, or Firm* — Beusse Wolter Sanks & Maire

(57) ABSTRACT

A turbine assembly includes a basically hollow aerofoil. A wall segment may be arranged at a side of the aerofoil. An insertion aperture in the wall segment provides access to the aerofoil and an impingement tube may be inserted via the insertion aperture into the aerofoil to be located within the aerofoil and extend at least in a span wise direction of the aerofoil. A protrusion section of the impingement tube may extend in a direction basically perpendicular to the span wise direction over an edge of the insertion aperture. The protrusion section may be overlapped by at least a part of the wall segment. Adjacent to the protrusion section, an overlap section of the impingement tube is arranged to abut the edge of the insertion aperture. The protrusion section and the overlap section may be formed integrally with each other in one piece.

18 Claims, 4 Drawing Sheets

(52) U.S. Cl.
CPC ...... *F05D 2230/51* (2013.01); *F05D 2230/53* (2013.01); *F05D 2230/61* (2013.01); *F05D 2250/70* (2013.01); *Y10T 29/49337* (2015.01)

(56) References Cited

U.S. PATENT DOCUMENTS

| | | | |
|---|---|---|---|
| 4,252,501 A | 2/1981 | Peill | |
| 4,474,532 A | 10/1984 | Pazder | |
| 4,482,295 A | 11/1984 | Szewczuk | |
| 4,798,515 A | 1/1989 | Hsia | |
| 5,145,315 A * | 9/1992 | North | F01D 5/189 29/889.722 |
| 5,253,976 A * | 10/1993 | Cunha | F01D 5/182 415/114 |
| 5,288,207 A | 2/1994 | Linask | |
| 5,419,039 A | 5/1995 | Auxier | |
| 5,630,700 A * | 5/1997 | Olsen | F01D 5/189 415/134 |
| 6,398,486 B1 * | 6/2002 | Storey | F01D 5/188 415/114 |
| 6,874,988 B2 * | 4/2005 | Tiemann | F01D 5/189 415/115 |
| 6,951,444 B2 * | 10/2005 | Dellmann | F01D 5/189 415/115 |
| 7,056,083 B2 | 6/2006 | Gray | |
| 8,353,668 B2 * | 1/2013 | Propheter-Hinckley | F01D 9/041 415/115 |
| 2003/0068222 A1 | 4/2003 | Cunha et al. | |
| 2007/0231150 A1 | 10/2007 | Bacha | |

FOREIGN PATENT DOCUMENTS

| | | |
|---|---|---|
| EP | 1160418 | 12/2001 |
| EP | 1160418 A2 | 12/2001 |
| EP | 1380725 | 1/2004 |
| EP | 1452690 | 9/2004 |
| EP | 1160418 B1 | 8/2005 |
| RU | 2043508 C2 | 9/1995 |

* cited by examiner

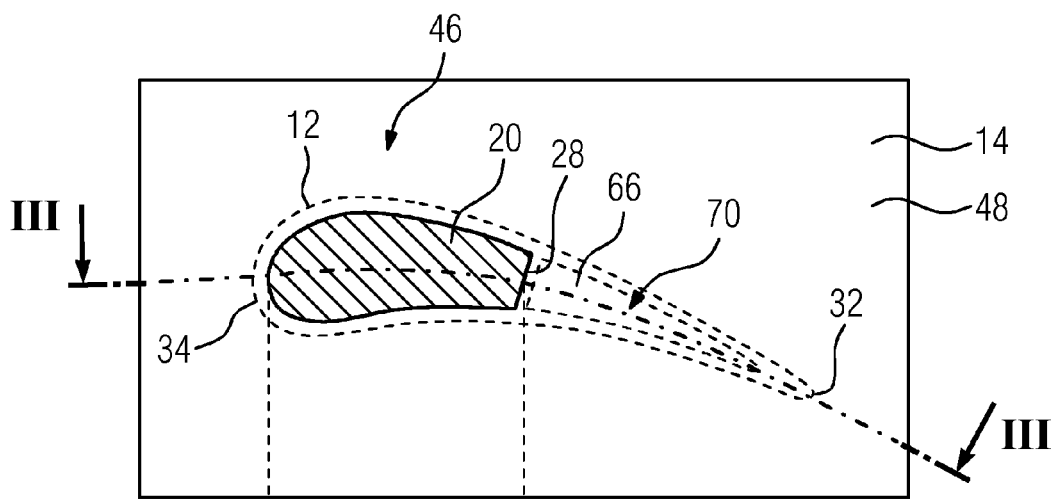
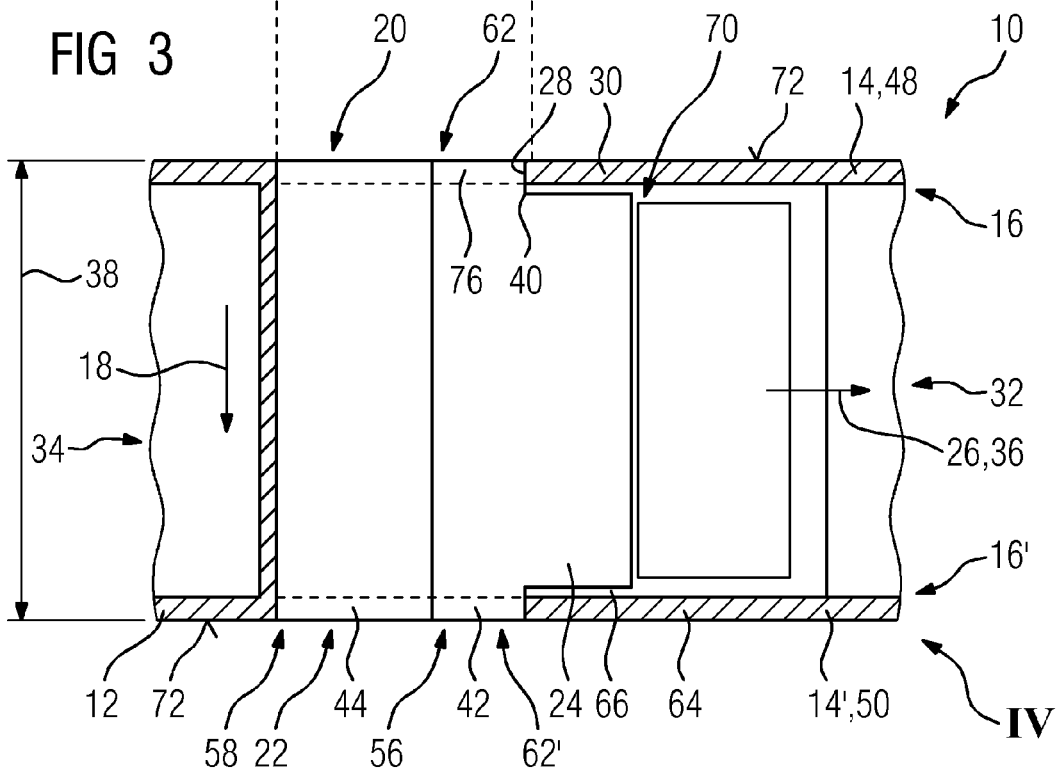

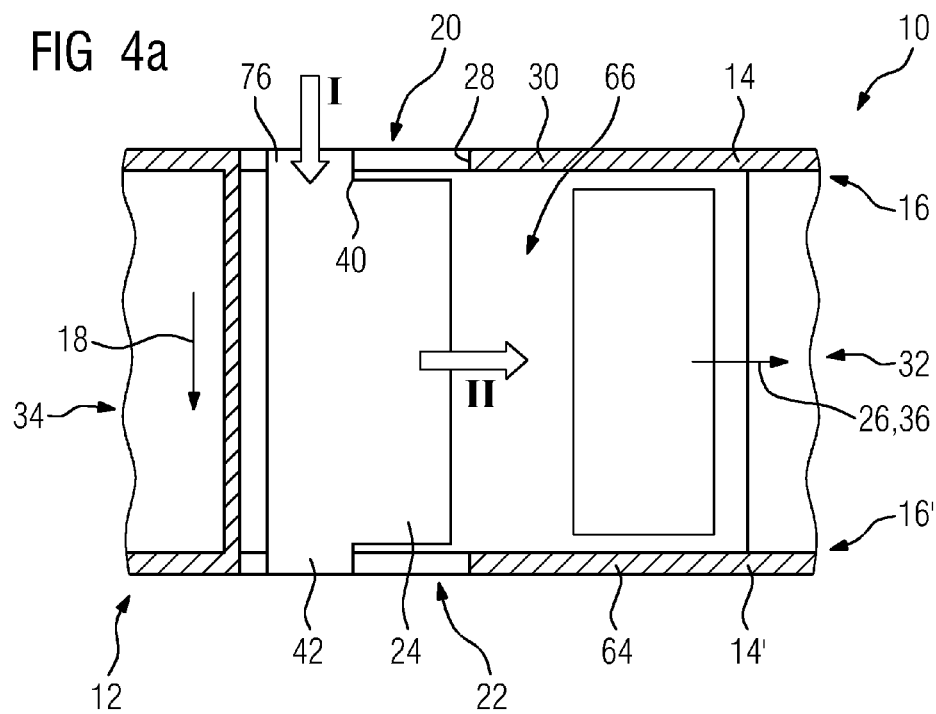
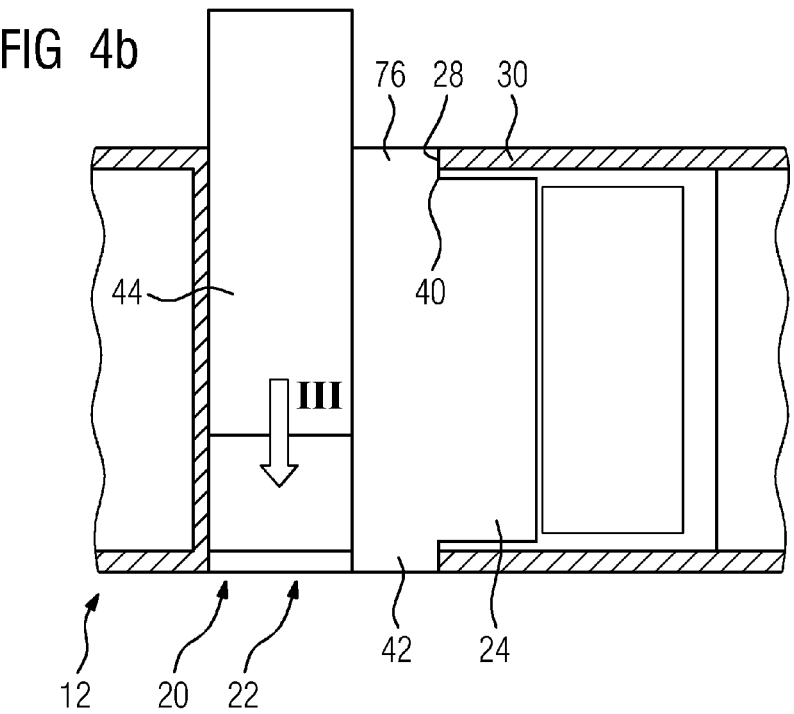

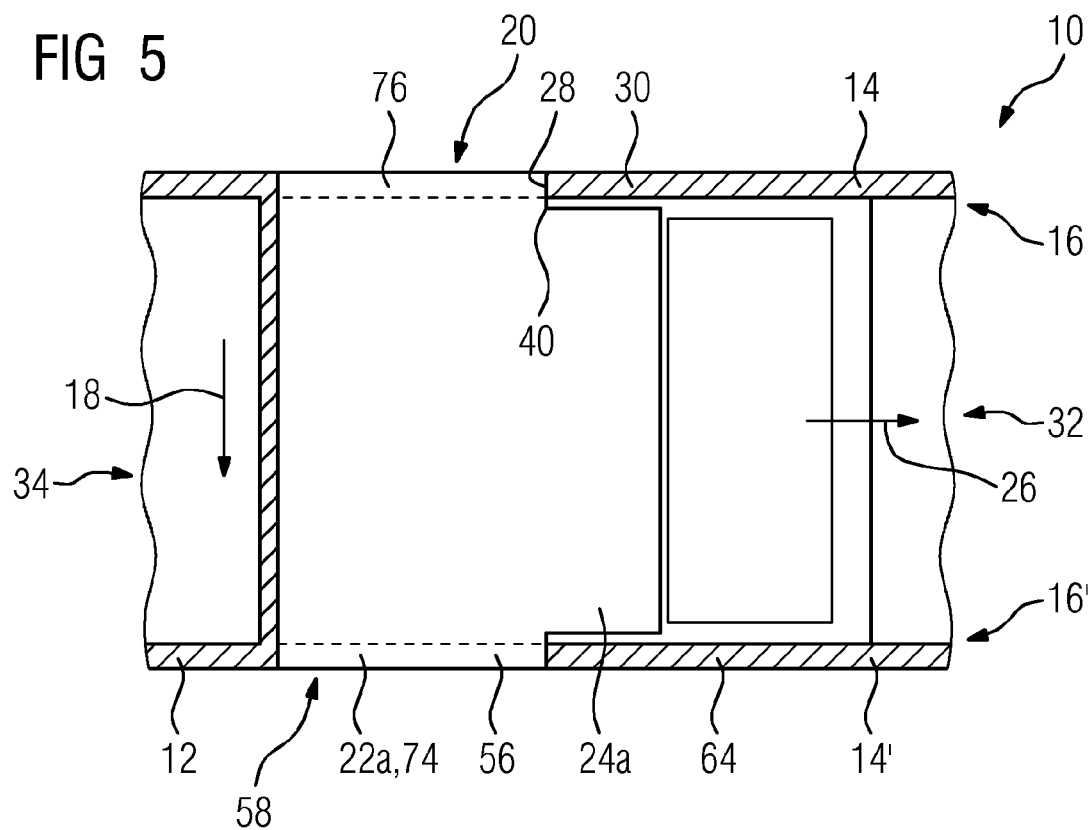

IMPINGEMENT COOLING OF TURBINE BLADES OR VANES

CROSS REFERENCE TO RELATED APPLICATIONS

This application is the US National Stage of International Application No. PCT/EP2012/060985 filed Jun. 11, 2012, and claims the benefit thereof. The International Application claims the benefit of European Application No. EP11171552 filed Jun. 27, 2011. All of the applications are incorporated by reference herein in their entirety.

FIELD OF THE INVENTION

The present invention relates to aerofoil-shaped turbine assembly such as turbine rotor blades and stator vanes. The present invention further relates to a method for assembling impingement tubes in such assemblies.

BACKGROUND OF INVENTION

Modern turbines often operate at extremely high temperatures. The effect of temperature on the turbine blades and/or stator vanes can be detrimental to the efficient operation of the turbine and can, in extreme circumstances, lead to distortion and possible failure of the blade or vane. In order to overcome this risk, high temperature turbines may include hollow blades or vanes incorporating so-called impingement tubes for cooling purposes.

These so-called impingement tubes are hollow tubes that run radially within the blades or vanes. Air is forced into and along these tubes and emerges through suitable apertures into a void between the tubes and interior surfaces of the hollow blades or vanes. This creates an internal air flow for cooling the blade or vane.

Normally, blades and vanes are made by casting having hollow structures. Impingement tubes may be inserted into the hollow structure from one or other end and usually welded with the hollow structure to fix them in place. Problems arise when a size of an impingement cooling zone and thus the region of the aerofoil with the highest cooling efficiency, is limited by the size of the opening through which the impingement tube is inserted into the aerofoil or the blades or vanes, respectively.

From EP 1 380 725 A2 it is known to embody the impingement tube as different box- or shell-shaped bodies. These bodies are all of a size approximately but no larger than an opening to insert said bodies into a chamber of a blade or vane and are inserted successively through said opening.

U.S. Pat. No. 4,798,515 A discloses a turbine assembly comprising a basically hollow aerofoil and a wall segment (fixed trunnion support portions) arranged at a side of the hollow aerofoil oriented basically perpendicular to a span wise direction of the hollow aerofoil. An insertion aperture is recessed in said wall segment providing access to the hollow aerofoil.

An impingement tube of the turbine assembly is positioned in the hollow aerofoil via a trunnion. Flared resilient portions of the impingement tube are braced or force fitted into an inlet aperture of the trunnion. The trunnion is located within the hollow aerofoil via trunnion mounted portions mating the wall segment, i.e. the fixed trunnion support portions.

It is desirable to provide a method for assembling an impingement tube in a hollow aero-foil of an aerofoil-shaped turbine assembly such as turbine rotor blade and stator vane which the above-mentioned shortcomings can be mitigated, and especially a more aerodynamic efficient aerofoil and gas turbine component is facilitated.

It is further desirable to provide an advantageous aerofoil-shaped turbine assembly such as a turbine rotor blade and a stator vane. It is also desirable to provide an advantageous impingement tube used in such an assembly for cooling purposes.

SUMMARY OF INVENTION

Accordingly, aspects of the present invention provide a turbine assembly comprising a basically hollow aerofoil, at least a wall segment arranged at a side of the hollow aerofoil oriented basically perpendicular to a span wise direction of the hollow aerofoil and with at least an insertion aperture in said at least one wall segment providing access to the hollow aerofoil and at least an impingement tube to be inserted via the insertion aperture into the hollow aerofoil to be located within the hollow aerofoil and extending in at least the span wise direction of the hollow aerofoil.

In an assembled state of the impingement tube in the aerofoil at least a protrusion section of the impingement tube extends in a direction oriented basically perpendicular to the span wise direction over an edge of the insertion aperture in the wall segment, wherein the protrusion section is overlapped by at least a part of the wall segment and wherein adjacent to the protrusion section an overlap section of the impingement tube is arranged which abuts the edge of the insertion aperture and wherein the protrusion section and the overlap section are formed integrally with each other in one piece. Due to inventive aspects, a size of an impingement cooling zone of the aerofoil could be advantageously and significantly increased. Hence, the region of the aerofoil with the highest cooling efficiency could be enlarged. Moreover, a size of an insertion aperture in the wall segment does not limit the cooling region of the assembly. Thus, more degrees of freedom for the construction of parts of the turbine assembly, like a casing of the aerofoil, an inner or outer platform and/or the insertion aperture it-self, are possible. With the use of such a turbine assembly conventional state of the art aerofoils could be used, without intricate and costly reconstruction of these aerofoils. It is only necessary e.g. to reduce a size of a pin fin/pedestal cooling region, which can be simply done with slight modification of a core of the casting of the aerofoil. Consequently, an efficient turbine assembly or turbine, respectively, could advantageously be provided. Furthermore, due to the one-piece design of the embodiment protrusion section and the overlap section the impingement tube could be arranged loss-proof in the aerofoil.

A turbine assembly is intended to mean an assembly provided for a turbine, like a gas turbine, wherein the assembly possesses at least an aerofoil. In one non-limiting embodiment, the turbine assembly has a turbine cascade and/or wheel with circumferential arranged aerofoils and/or an outer and an inner platform arranged at opponent ends of the aerofoil(s). In this context a "basically hollow aerofoil" means an aerofoil with a casing, wherein the casing encases at least one cavity. A structure, like a rib, rail or partition, which divides different cavities in the aerofoil from one another and for example extends in a span wise direction of the aerofoil, does not hinder the definition of "a basically hollow aerofoil". In one non-limiting embodiment, the aerofoil is hollow. In particular, the basically hollow aerofoil, referred as aerofoil in the following description, has two cooling regions, an impingement cooling region at a leading edge of the aerofoil and a state of the art pin-fin/pedestal cooling region at the trailing edge. These regions could be separated from one another through a rib. A wall segment is intended to mean a region of the turbine assembly which confines at least a part of a cavity and in particular, a cavity of the aerofoil. The wall segment could be a region of the casing of the aerofoil or in one non-limiting embodiment, a region of the inner platform and/or the outer platform. By an embodiment of the latter two, the same kind of aerofoil construction could be used with a variety of different platforms and insertion apertures in the platforms.

In the scope of an arrangement of the side as "basically perpendicular" to a span wise direction should also lie a divergence of the side of the wall segment in respect to the span wise direction of about 30°. In one non-limiting embodiment, the side is arranged perpendicular to the span wise direction. A span wise direction of the hollow aerofoil is defined as a direction extending basically perpendicular, preferably perpendicular, to a direction from the leading edge to the trailing edge of the aerofoil. An "insertion aperture" is intended to mean an opening, a cut and/or a hole, especially a through hole, which is intended, primed, designed and/or embodied for an insertion of at least an impingement tube into the aerofoil or its cavity, respectively. Thus, the insertion aperture and the impingement tube are matched to one another, for example in respect to size, material properties or the like, to allow the insertion of the impingement tube.

An assembled state of the impingement tube in the aerofoil represents a state of the turbine assembly when it is intended to work and in particular, a working state of the turbine assembly or the turbine, respectively. A protrusion section means a section of the impingement tube that protrudes from a main part of the impingement tube. The main part in one non-limiting embodiment defines a main reach of the impingement tube, especially in the span wise direction. Moreover, an edge of the insertion aperture is intended to mean an end, a border, a mechanical stop and/or a limit of the insertion aperture. Further, the term "adjacent" should be understood as adjoining, bordering and/or conterminal. An overlap section is intended to mean a structure which extends in span wise direction over a span of the protrusion section. In one non-limiting embodiment, the overlap section abuts the edge axially and/or extends over a whole span of the insertion aperture in span wise direction. Generally it would also be feasible that the overlap section extends only over a part of the span of the insertion aperture. In this context the wording "integrally formed" is intended to mean, that the protrusion section and the overlap section are molded out of one piece.

Advantageously, the hollow aerofoil comprises a single cavity. But the invention could also be realized for a hollow aerofoil comprising two or more cavities each of them accommodating an impingement tube according to the invention and/or being a part of the fin-pin/pedestal cooling region, stated above, the hollow aerofoil comprises a trailing edge and a leading edge. In a preferred embodiment the protrusion section of the impingement tube extends in a direction oriented to the trailing edge. This results in an efficient use of the free space of the cavity and a direct cooling of this region. Moreover, the protrusion section could be provided with through holes. Thus, cooling medium guided via the impingement tube could be easily directed to the non-impingement pin-fin/pedestal cooling region.

In one non-limiting embodiment, the impingement tube extends substantially completely through a span of the hollow aerofoil resulting in a powerful cooling of the aerofoil. Furthermore, it is advantageous when the impingement tube has a stepped contour which abuts the edge of the insertion aperture. A stepped contour is intended to mean a structure of the impingement tube with at least one step. The stepped contour may be built from a wall segment from the protrusion section and from a wall segment of the overlap section. By means of the inventive embodiments an alignment of the impingement tube with the insertion aperture could easily be provided. Further, the stepped contour assures a loss-proof positioning of the impingement tube. It is also possible, that a leading part of the impingement tube, which is oriented towards the leading edge, has substantially the same contour as an interior surface of the leading edge of the hollow aerofoil and/or that the protrusion section has substantially the same contour as an interior surface of the trailing edge of the hollow aerofoil.

In a further advantageous embodiment the impingement tube being formed from at least two separate pieces. According to the inventive solution the use of a two or more piece impingement tube, especially the possibility of an individual assembling of a piece, allows a bigger cavity of the aerofoil despite a small insertion aperture. This increases the aerodynamic efficiency of the aerofoil and hence the efficiency of the turbine—by avoiding mounting inadequacy. Furthermore, the at least two separate pieces are formed from a trailing piece and a leading piece, wherein in particular the trailing piece is located towards the trailing edge of the hollow aerofoil and the leading piece is located towards the leading edge of the hollow aerofoil. Moreover, the protrusion section is arranged at the trailing piece and is oriented towards the trailing edge. Through this advantageous arrangement the free space of the cavity is efficiently used for the direct cooling of this region by means of the protrusion section.

But it is also conceivable that the impingement tube being formed from three separate pieces, particularly as a leading, a middle and a trailing piece of the impingement tube, wherein the leading piece could be located towards the leading edge of the hollow aerofoil, the middle piece could be located in a middle of the hollow aerofoil or the cavity thereof, respectively, and/or the trailing piece could be located towards a trailing edge of the hallow aerofoil. An order while assembling the pieces could be with the trailing piece first, following the middle piece and the leading piece third. The order of assembling the middle and the leading piece could also be reverse with the leading piece following the middle piece.

Advantageously, each of the at least two separate pieces extends substantially completely through a span of the hollow aerofoil resulting in an effective cooling of the aerofoil. But it is also conceivable that at least one of the at least two separate pieces would extend only through a part of the span of the hollow aerofoil.

In an advantageous embodiment the leading piece locks the trailing piece into position in the hollow aerofoil thereby preventing the trailing piece to become dislocated from the hollow aerofoil. Thus, the alignment of the trailing piece in the aerofoil could be accomplished without high constructive efforts. The locking process could be mediated via any mechanism feasible for a person skilled in the art, for example, via a locking member arranged in-between the leading piece and the trailing piece, an adhesion bond and/or in one non-limiting embodiment, via a press fit and/or a form fit. Consequently, no additional pieces are needed to fasten the trailing piece into place or position. Hence, costs for pieces and assembly could be spared. In an embodiment with more than two separate pieces the leading piece could be used to lock all other pieces into position.

In one non-limiting embodiment, the locking process is accomplished via a form fit between the stepped contour of the impingement tube and the edge of the insertion aperture resulting in a proper alignment of the tailing piece in the aerofoil.

To provide the turbine assembly with good cooling properties and a satisfactory alignment of the impingement tube in the aerofoil, the hollow aerofoil comprises at least a spacer at an interior surface of the hollow aerofoil to hold the impingement tube at a predetermined distance to said surface of the hollow aerofoil. The spacer in one non-limiting embodiment may be embodied as a protrusion or a locking pin or a rib for easy construction and a straight seat of the impingement tube.

In a further advantageous embodiment the hollow aerofoil is a turbine blade or vane, for example a nozzle guide vane.

The invention further provides an impingement tube with a base body for localization within a basically hollow aerofoil of a turbine assembly with at least a wall segment. The impingement tube or the base body, respectively, comprises at least a protrusion section, wherein the protrusion section forms a stepped counter. The stepped contour in one non-limiting embodiment may be arranged to abut an edge of an insertion aperture in the wall segment to establish a form fit between the stepped con-tour and the edge of the insertion aperture in an assembled state in the hollow aerofoil. Due to this the alignment of the impingement tube and the insertion aperture could easily be provided. In this context a "base body" is intended to mean a structure that substantially imparts a shape and/or form of the impingement tube.

The impingement tube according to the invention could be used with state of the art aerofoils to increase their cooling efficiency. Thus, with this use of the inventive impingement tube there is no need to reconstruct a conventional casing of such an aerofoil to employ the latter in constructions with limited access to the cavity of the aerofoil. Hence, costs and construction efforts could be reduced, especially; since the impingement tubs are low cost items.

The present invention also provides a method for assembling an impingement tube in a basically hollow aerofoil of a turbine assembly. Said method comprises the steps of inserting the impingement tube through an insertion aperture in a wall segment into the hallow aerofoil, wherein the wall segment is arranged at a side of the hollow aerofoil oriented basically perpendicular to a span wise direction of the hollow aerofoil, maneuvering of at least a protrusion section of the impingement tube into position so that the protrusion section extends in a direction oriented basically perpendicular to the span wise direction over an edge of the insertion aperture in the wall segment, wherein the protrusion section is overlapped by at least a part of the wall segment and wherein adjacent to the protrusion section an overlap section of the impingement tube is arranged which abuts the edge of the insertion aperture in the wall segment and wherein the protrusion section and the overlap section are formed integrally with each other in one piece.

Due to the inventive method a size of an insertion aperture does not limit the cooling region of the assembly. Consequently, a size of an impingement cooling zone of the aerofoil could be advantageously and significantly increased. Hence, the region of the aerofoil with the highest cooling efficiency could be enlarged. Thus, more degrees of freedom for the construction of parts of the turbine assembly are possible. As a result; an efficient turbine assembly or turbine, respectively, could advantageously be assembled and thus provided. Moreover, due to the one-piece design of the protrusion section and the overlap section the impingement tube could be arranged or retained loss-proof in the aerofoil.

The phrase "maneuvering into position" is intended to mean a process mediated via a passive or an active mechanism. A passive mechanism could for example be a characteristic of the impingement tube itself or of a material of the impingement tube, like a flexibility or resilience. Otherwise, an active mechanism could e.g. be a use of an active component of the protrusion section for its extension and thus positioning, like a spring, and/or a use of an external force for the positioning.

Advantageously, the impingement tube consists of at least a leading piece and a trailing piece and wherein after a maneuvering of the trailing piece into position the leading piece is inserted into the hallow aerofoil adjacent to the trailing piece through the insertion aperture in the wall segment and maneuvered into position in the hallow aerofoil. The invention is based on the insight that the limitation in insertion space of an insertion aperture could be avoided by using a two or more piece impingement tube; wherein each piece could be assembled individually in the hollow aerofoil. Each piece is slide individually in the hallow aerofoil, i.e. in a cavity of the hallow aerofoil, and then moved in their correct location or position.

In one non-limiting embodiment, the position of the trailing piece is locked into position in the hollow aerofoil via the leading piece thereby preventing the trailing piece to become dislocated from the hollow aerofoil. Particularly, the position of the trailing piece is locked into position in the hollow aerofoil via a press fit and/or a form fit resulting in a proper alignment of the tailing piece in the aerofoil. If the locking is facilitated via a form fit between the stepped contour of the impingement tube and the edge of the insertion aperture an advantageously loss proof arrangement could be gained.

According to aspects of the inventive method in particular a turbine assembly could be provided, where an impingement tube is formed of two separate pieces. Further the two separate pieces are positioned in a basically hollow aerofoil via an insertion aperture in a wall segment arranged at a side of the hollow aerofoil oriented basically perpendicular to a span wise direction of the hollow aerofoil and wherein in an assembled state a protrusion section of the impingement tube or of one of the two separate pieces or the trailing piece, respectively, extends in a direction oriented basically perpendicular to the span wise direction over an edge of the insertion aperture in the wall segment, wherein the protrusion section is overlapped by at least a part of the wall segment and wherein adjacent to the protrusion section an overlap section of the impingement tube is arranged which abuts the edge of the insertion aperture and wherein the protrusion section and the overlap section are formed integrally with each other in one piece.

BRIEF DESCRIPTION OF THE DRAWINGS

The present invention will be described with reference to drawings in which:

FIG. 2: shows a top view of an outer platform with an insertion aperture and the aerofoil from FIG. 1 beneath, FIG. 3: shows a cross section along line III-III in FIG. 2 depicting the inserted impingement tube from FIG. 1 being formed from two pieces, FIG. 4a: show a first drawing of a method for an assembly of the two pieces of the impingement tube from FIGS. 1 and 3 inside a cavity of a hollow aerofoil during insertion of a trailing part, FIG. 4b: show a second drawing of the method from FIG. 4a during insertion of a leading part and FIG. 5: shows a cross section through an aerofoil with an alternatively embodied impingement tube.

DETAILED DESCRIPTION OF THE ILLUSTRATED EMBODIMENTS

Figure 1:
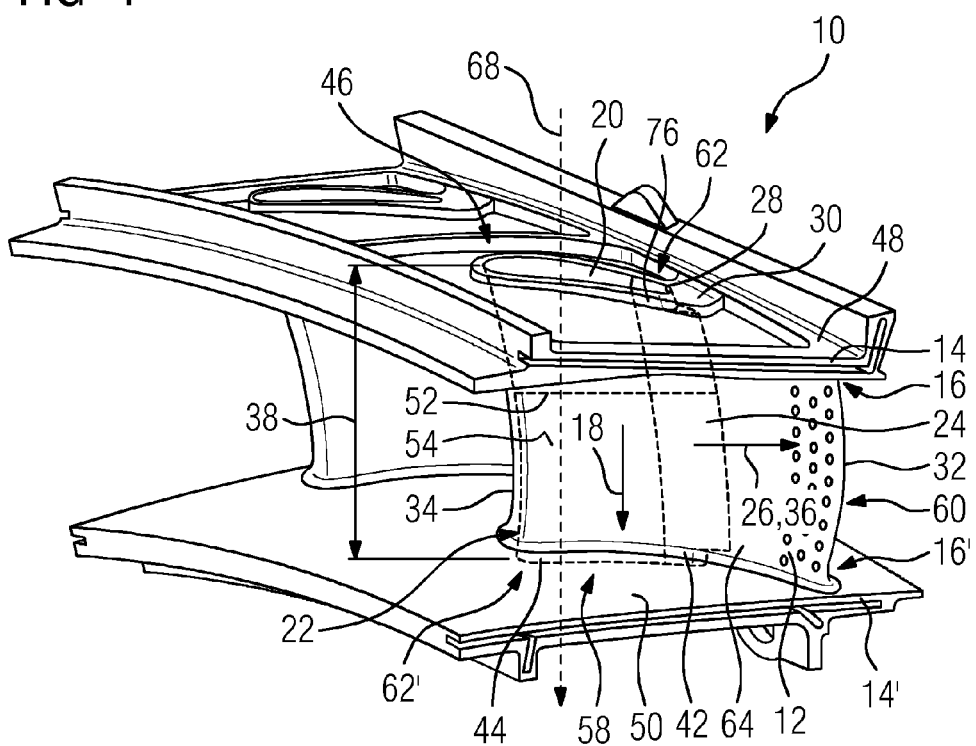
FIG. 1: shows a perspective view of a turbine assembly with an impingement tube inserted into an aerofoil.

In the present description, reference will only be made to a vane, for the sake of simplicity, but it is to be understood that the invention is applicable to both blades and vanes of a turbine.

FIG. 1 shows in a perspective view a turbine assembly 10. The turbine assembly 10 comprises a basically hallow aerofoil 12, embodied as a vane, with two cooling regions, specifically, an impingement cooling region 58 and a fin-pin/pedestal cooling region 60. The former is located at a leading edge 34 and the latter at a trailing edge 32 of the aerofoil 12. Arranged at two sides 16, 16' of the hollow aerofoil 12, wherein the two sides 16, 16' are oriented basically perpendicular to a span wise direction 18 of the hollow aerofoil 12 and are positioned on opposed ends 62, 62' of the aerofoil 12, are two wall segments 14, 14' arranged. The wall segments 14, 14' are regions 46 of an inner platform 48 and an outer platform 50. Each wall segment 14, 14' has an insertion aperture 20 which is arranged in alignment with the impingement cooling region 58 of the aerofoil 12 and provides access to the hollow aero-foil 12 (only the insertion aperture of wall segment 14 is shown in FIG. 1). In a circumferential direction of a not shown turbine cascade several aerofoils 12 could be arranged, wherein all aerofoils 12 where connected through the inner and the outer platforms 48, 50 with one another.

A casing 64 of the hollow aerofoil 12 forms a cavity 66 in the impingement cooling region 58. Via the insertion aperture 20 is an impingement tube 22 inserted inside the cavity 66 for cooling purpose. Thus, the impingement tube 22 is in an assembled state of the impingement tube 22 in the hollow aerofoil 12 located within the hollow aerofoil 12. The impingement tube 22 extends in span wise direction 18 completely through a span 38 of the hollow aerofoil 12 and is embodied as a base body 56. Further, during an operation of the turbine assembly 10 the impingement tube 22 provides a flow path 68 for a cooling medium, like air. At an interior surface 54 of the hollow aerofoil 12 it comprises a number of spacers 52 to hold the impingement tube 22 at a predetermined distance to this surface 54. The spacers 52 are embodied as protrusions or ribs, which extend perpendicular to the span wise direction 18.

As shown in FIG. 2, which illustrates a top view of the outer platform 48 with the aerofoil 12 depicted in dashed lines beneath, the insertion aperture 20 is aligned with the cavity 66 of the aerofoil 12. However, the cavity 66 is in a direction 26, which is oriented perpendicular in respect to the span wise direction 18, larger than the insertion aperture 20. To insert an impingement tube 22 that also occupies a region 70 of the cavity 66, which is not aligned with the insertion aperture 20, the impingement tube 22 is formed from two separate pieces 42, 44, as can be seen in the detailed illustration in FIG. 3. The two pieces 42, 44 are formed from a trailing piece 42, which is located towards the trailing edge 32 of the hollow aerofoil 12 and a leading piece 44, which is located towards the leading edge 34. Both pieces 42, 44 extend completely through the span 38 of the hollow aero-foil 12 and are flush with an outer surface 72 of the inner and the outer platform 48, 50.

In the assembled state of the impingement tube 22 or the two pieces 42, 44, respectively, a protrusion section 24 of the impingement tube 22 or the trailing piece 42, respectively, extends in direction 26 over an edge 28 of the insertion aperture 20 and the protrusion section 24 is overlapped by a part 30 of the wall segment 14, 14'. Hence, protrusion section 24 extends in a direction 36 oriented to the trailing edge 32. This is especially depicted by the dashed lines extending from the insertion aperture 20 in FIG. 2 to the insertion aperture 20 in FIG. 3. The right line, if it would be drawn, would extend through the protrusion section 24. Adjacent to the protrusion section 24 an overlap section 76 of the impingement tube 22 is arranged. This overlap section 76 abuts the edge 28 of the insertion aperture 20 and extends in span wise direction 18 over a whole span of the insertion aperture 20. The protrusion section 24 and the overlap section 76 are formed integrally with each other being molded out of one piece. The impingement tube 22 has and the protrusion section 24 forms a stepped counter 40, which abuts the edge 28 of the insertion aperture 20. In the assembled state the leading piece 44 locks the trailing piece 42 into position in the hollow aerofoil 12 thereby preventing the trailing piece 42 to become dislocated from the aerofoil 12. This locking mechanism is mediated via a press fit and a form fit between the stepped contour 40 of the impingement tube 22 and the edge 28 of the insertion aperture 20.

In respect to FIGS. 4a and 4b the method for assembling the impingement tube 22 in the hollow aerofoil 12 of the turbine assembly 10 will be explained. In a first assembly step the trailing piece 42 of the impingement tube 22 is inserted through the insertion aperture 20 in the wall segment 14 into the hallow aerofoil 12 (I). In a following second assembly step the protrusion section 24 of the impingement tube 22 or the trailing piece 42 is maneuvered into position so that the protrusion section 24 extends in direction 26 oriented basically perpendicular to the span wise direction 18 over the edge 28 of the insertion aperture 20 in the wall segment 14, 14', wherein the protrusion section 24 is overlapped by at least the part 30 of the wall segment 14, 14' and wherein adjacent to the protrusion section 24 the overlap section 76 of the impingement tube 22 is arranged which abuts the edge 28 of the insertion aperture 20 and wherein the protrusion section 24 and the overlap section 76 are formed integrally with each other in one piece (II). The maneuvering could be e.g. be performed by a manually applied force. The movement of the trailing piece 42 is limited by a contacting of the stepped contour 40 with the edge 28 of the insertion aperture 20 (FIG. 4A).

In a third assembly step the leading piece 44 is inserted into the hallow aerofoil 12 adjacent to the trailing piece 42 and at a side oriented to the leading edge 34 of the aerofoil 12 through the insertion aperture 20 in the wall segment 14. Thereafter, the leading piece 44 is maneuvered into position in the hollow aerofoil 12 (III) (FIG. 4B). In a final and forth assembly step the position of the trailing piece 42 is locked into position in the hollow aerofoil 12 via the leading piece 44 thereby preventing the trailing piece 42 to become dislocated from the hollow aerofoil 12 (IV), wherein the locking mechanism is mediated via a press fit and a form fit between the stepped contour 40 of the impingement tube 22 and the edge 28 of the insertion aperture 20. The assembled state could be seen in FIG. 3.

Alternatively, walls of the trailing piece 42 and of the leading piece 44, which are facing one another, could be embodied with communicating apertures (not shown). Moreover, it could also be possible to omit these walls entirely so that they interlocked in the assemble position to form a single internal cavity (see FIG. 5).

In FIG. 5 an alternative embodiment of the impingement tube 22 is shown. Components, features and functions that remain identical are in principle substantially denoted by the same reference characters. To distinguish between the embodiments, however, the letter "a" has been added to the different reference characters of the embodiment in FIG. 5. The following description is confined substantially to the differences from the embodiment in FIGS. 1 to 4, wherein with regard to components, features and functions that remain identical reference may be made to the description of the embodiment in FIGS. 1 to 4.

FIG. 5 shows a cross section through an aerofoil 12 analogously formed as in FIGS. 1 to 4 with an alternatively embodied impingement tube 22a. The embodiment from FIG. 5 differs in regard to the embodiment according to FIGS. 1 to 4 in that the impingement tube 22a is embodied as a single piece 74. To allow an insertion of the single piece impingement tube 22a through an insertion aperture 20 of a wall segment 14 into the hollow aerofoil 12 the impingement tube 22a has a protrusion section 24a which is formed from a flexible material. Alternatively, the whole impingement tube could be formed from a flexible material. Thus, after an insertion of the impingement tube 22a through the insertion aperture 20 the protrusion section 24a is maneuvered into position through its own strength due to the resilient properties of the flexible material (not shown in detail). Hence, in an assembled state the protrusion section 24a extends in a direction 26 oriented perpendicular to the span wise direction 18 over an edge 28 of the insertion aperture 20 and wherein the protrusion section 24a is overlapped by a part 30 of the wall segment 14, 14'. Moreover, adjacent to the protrusion section 24a an overlap section 76 abuts the edge 28 of the insertion aperture 20. The protrusion section 24a and the overlap section 76 are formed integrally with each other in one piece.

Generally, it would also be possible to embody an edge of the insertion aperture or the whole region of the wall segment with the insertion aperture out of a flexible or resilient material.

Another way would be to embody the impingement tube as an expandable single piece, wherein the single piece expands in situ to take the shape shown in FIG. 5. This could be maintained using e. g. a fluid, a compressed gas or more preferably a liquid. For example, the liquid could be filled in a double-walled casing of the impingement tube for expansion. Additionally, the liquid could be cured with any suitable method like polymerization or radiation (UV, IR etc.) to stabilize the casing. Further, it is also possible to manufacture the casing out of a shape memory material, wherein the tool for expansion (mechanical means, fluid, gas, liquid) could be removed after expansion. Alternatively, the extended single piece could be kept in place with any method feasible for a person skilled in the art, like cluing or welding.

The invention claimed is:

1. A turbine assembly comprising
a basically hollow aerofoil,
at least a wall segment arranged at a side of the hollow aerofoil oriented basically perpendicular to a span wise direction of the hollow aerofoil and with at least an insertion aperture in said at least one wall segment providing access to the hollow aerofoil and at least an impingement tube to be inserted via the insertion aperture into the hollow aerofoil to be located within the hollow aerofoil and extending in at least the span wise direction of the hollow aerofoil,
wherein in an assembled state of the impingement tube in the hollow aerofoil at least a protrusion section of the impingement tube extends in a direction oriented basically perpendicular to the span wise direction over an edge of the insertion aperture in the wall segment, wherein the protrusion section is overlapped by at least a part of the wall segment and wherein adjacent to the protrusion section an overlap section of the impingement tube is arranged which abuts the edge of the insertion aperture in the wall segment and wherein the protrusion section and the overlap section are formed integrally with each other in one piece.

2. The turbine assembly according to claim 1, wherein the hollow aerofoil comprises a trailing edge and a leading edge, and wherein the protrusion section of the impingement tube extends in a direction oriented to the trailing edge.

3. The turbine assembly according to claim 1, wherein the impingement tube extends substantially completely through a span of the hollow aerofoil.

4. The turbine assembly according to claim 1, wherein the impingement tube has a stepped contour which abuts the edge of the insertion aperture in the wall segment.

5. The turbine assembly according to claim 1, wherein the impingement tube is formed from at least two separate pieces, from a trailing piece and a leading piece, wherein the trailing piece is located towards a trailing edge of the hollow aerofoil and the leading piece is located towards a leading edge of the hollow aerofoil.

6. The turbine assembly according to claim 1, wherein the impingement tube is formed from at least two separate pieces each extending substantially completely through a span of the hollow aerofoil.

7. The turbine assembly according to claim 5, wherein the leading piece locks the trailing piece into position in the hollow aerofoil, thereby preventing the trailing piece to become dislocated from the hollow aerofoil.

8. The turbine assembly according to claim 5, wherein the leading piece locks the trailing piece into position in the hollow aerofoil via a press fit structure and/or a form fit structure.

9. The turbine assembly according to claim 1, wherein the wall segment with at least the insertion aperture in the wall segment is a region of an outer platform and/or an inner platform.

10. The turbine assembly according to claim 1, wherein the hollow aerofoil comprises at least a spacer at an interior surface of the hollow aerofoil to hold the impingement tube at a predetermined distance to said surface of the hollow aerofoil, wherein said at least spacer comprises a protrusion or a locking pin or a rib.

11. The turbine assembly according to claim 1, wherein the hollow aerofoil is a turbine blade or vane.

12. The turbine assembly according to claim 8, wherein the form fit structure is disposed between a stepped contour of the impingement tube and the edge of the insertion aperture in the wall segment.

13. A method for assembling an impingement tube in a basically hollow aerofoil of a turbine assembly, said method comprising:
- inserting the impingement tube through an insertion aperture in a wall segment into the hollow aerofoil, wherein the wall segment is arranged at a side of the hollow aerofoil oriented basically perpendicular to a span wise direction of the hollow aerofoil,
- maneuvering of at least a protrusion section of the impingement tube into position so that the protrusion section extends in a direction oriented basically perpendicular to the span wise direction over an edge of the insertion aperture in the wall segment wherein the protrusion section is overlapped by at least a part of the wall segment and wherein adjacent to the protrusion section an overlap section of the impingement tube is arranged which abuts the edge of the insertion aperture in the wall segment and wherein the protrusion section and the overlap section are formed integrally with each other in one piece.

14. The method for assembling an impingement tube in a hollow aerofoil of a turbine assembly according to claim 13, wherein the impingement tube comprises at least a trailing piece and a leading piece and wherein after a maneuvering of the trailing piece into position the leading piece is inserted into the hallow aerofoil adjacent to the trailing piece through the insertion aperture in the wall segment and maneuvered into position in the hallow aerofoil.

15. The method for assembling an impingement tube in a hollow aerofoil of a turbine assembly according to claim 14, further comprising locking the trailing piece into position in the hollow aerofoil via the leading piece thereby preventing the trailing piece to become dislocated from the hollow aerofoil, wherein the locking of the trailing piece into position in the hollow aerofoil comprises a press fitting and/or a form fitting.

16. A turbine assembly comprising:
- an airfoil extending in a spanwise direction;
- a platform attached to an end of the airfoil and extending generally perpendicularly to the spanwise direction;
- an aperture in the platform providing access to a hollow interior of the airfoil, the aperture defined at least in part by an edge of the platform; and
- an impingement tube disposed in the hollow interior of the airfoil and comprising:
  - a trailing piece sized for insertion through the aperture and comprising:
    - a protrusion section extending under an overlapping part of the platform; and
    - an overlap section extending from the protrusion section; and
  - a leading piece locking the trailing piece in position with the overlap section abutting the edge of the platform, the leading piece sized for insertion through the aperture after the trailing piece has been inserted.

17. The turbine assembly of claim 16, wherein the leading piece locks the trailing piece in position with a press fit.

18. The turbine assembly of claim 16, wherein the trailing piece and the overlap section are formed integrally.

\* \* \* \* \*